Dec. 14, 1954
J. B. KUCERA
2,696,703
WINDROWER ATTACHMENT
Filed Oct. 5, 1950
2 Sheets-Sheet 1
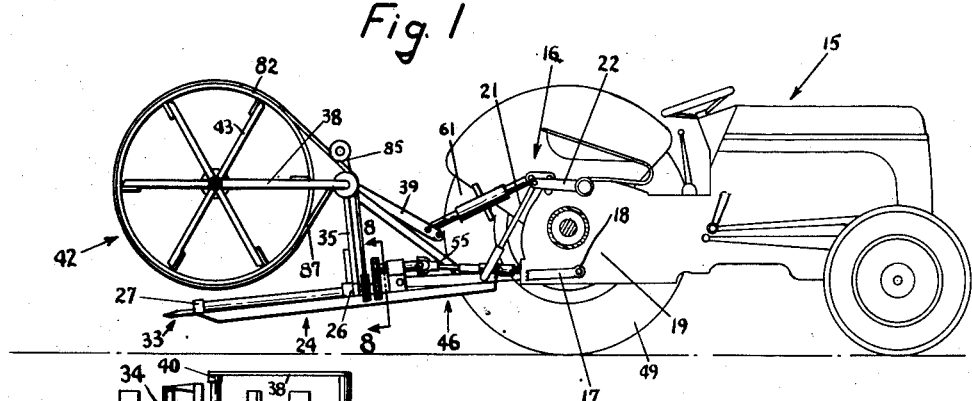
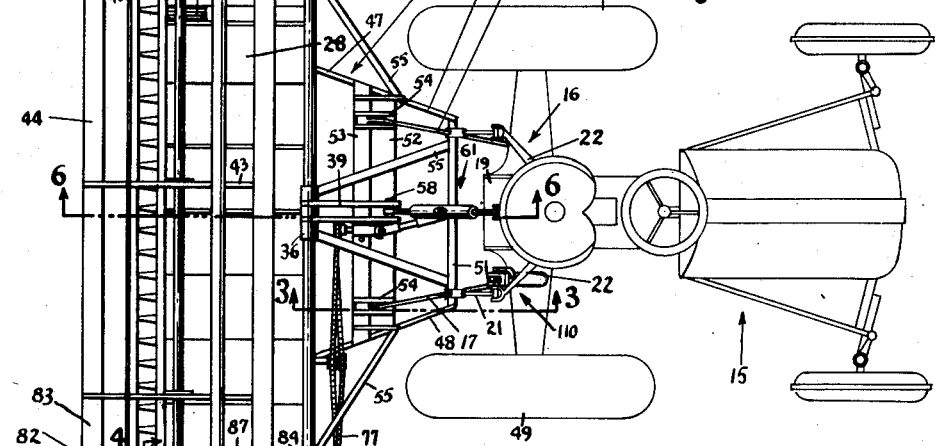
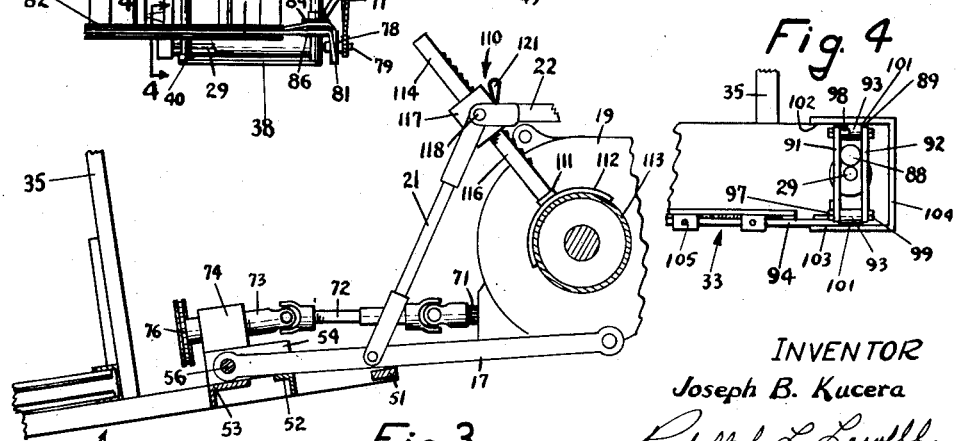
INVENTOR
Joseph B. Kucera
By Rudolph L. Lowell
Atty.

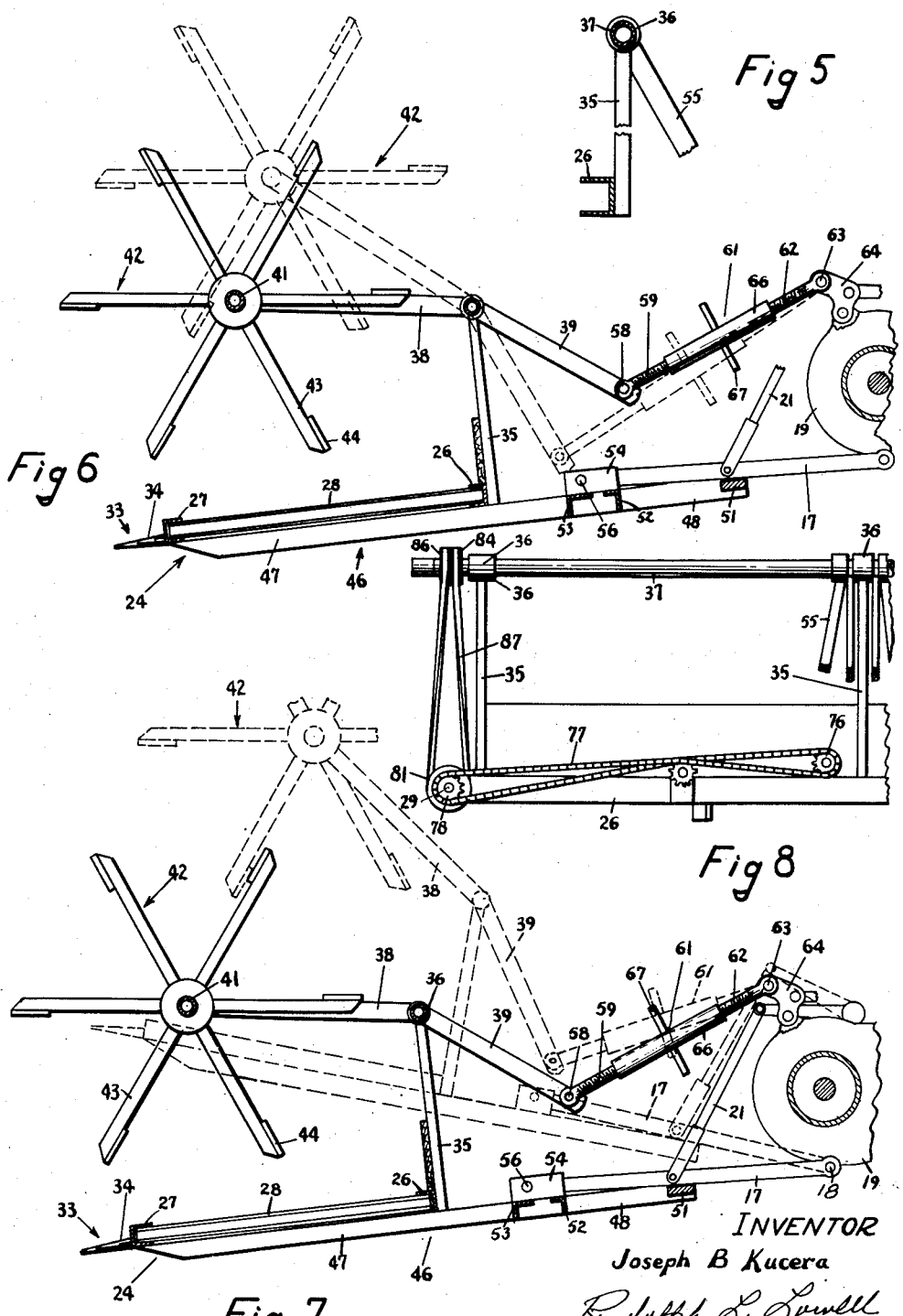

United States Patent Office 2,696,703
Patented Dec. 14, 1954

2,696,703

WINDROWER ATTACHMENT

Joseph B. Kucera, Traer, Iowa

Application October 5, 1950, Serial No. 188,591

7 Claims. (Cl. 56—23)

This invention relates generally to harvesting machines and in particular to a rear mounted windrower attachment for a farm tractor.

An object of this invention is to provide an improved windrower machine.

A further object of this invention is to provide a windrower attachment adapted to be carried rearwardly of a tractor on a power operated lift frame for up and down movement with the lift frame.

Yet another object of this invention is to provide a rear end windrower attachment for a tractor having a rearwardly extended lift frame, in which the reel member is movable relative to the cutter mechanism in response to the pivoted movement of the lift frame.

A still further object of this invention is to provide a windrower attachment for mounting on a pair of pivoted lift arms on a tractor in which a reel member, cutter mechanism and conveyer are driven from a common drive member forming part of the attachment and operated from a power take-off on the tractor.

Yet another object of this invention is to provide a windrower attachment for mounting on a pair of pivoted lift arms on a tractor in which a reel member is adjustably movable relative to a cutter mechanism at any moved position of the lift arms, and in an adjusted position is moved upwardly from the cutter mechanism in response to an upward movement of the lift arms.

Still a further object of this invention is to provide a windrower attachment for a tractor which is of an economical and simple construction, capable of being easily and quickly mounted upon and removed from a tractor, and efficient in operation to cut a crop and deposit the same in a windrow to one side of the tractor without any damage to the crop by the tractor wheels.

Further objects, features and advantages of this invention will become apparent from the following description when taken in connection with the accompanying drawings in which:

Fig. 1 is a side elevational view of the windrower attachment of this invention shown in assembly relation with the power lift on a tractor, of well known type, and with parts of the tractor being removed to more clearly show this assembly relation;

Fig. 2 is a plan view of the assembly shown in Fig. 1;

Fig. 3 is an enlarged sectional detail view taken on the line 3—3 in Fig. 2;

Fig. 4 is an enlarged detail sectional view taken on the line 4—4 in Fig. 2;

Fig. 5 is an enlarged sectional view taken on the line 5—5 in Fig. 2;

Fig. 6 is an enlarged sectional view taken substantially along the line 6—6 in Fig. 2 showing the adjustment means for the reel member of the windrower attachment;

Fig. 7 is illustrated similarly to Fig. 6 and shows parts in changed positions; and, Fig. 8 is an enlarged fragmentary sectional view taken substantially along the line 8—8 in Fig. 1.

Referring to Figs. 1 and 2 of the drawings the windrower attachment of this invention is shown in assembly relation with a tractor, of well known type, designated generally as 15. This tractor is equipped with a hydraulic power unit 16 of a well-known type which has a pair of lift arms 17 swivelly connected at 18 to opposite sides of the tractor differential housing 19. Lift links 21 are connected with the lift arms 17 and with a pair of rock arms 22 which are actuated, on operation of the power unit 16, to move the lift arms 17 whereby to raise and lower any farm implement supported thereon.

The hydraulic power lift 16 briefly discussed above is well known commercially and forms no part of the present invention.

The windrower attachment of this invention (Figs. 1, 2 and 6) includes a main frame indicated at 24 which is of a substantially rectangular shape and extends transversely of the tractor at a position rearwardly of the tractor. The main frame 24 includes a front side member 26 and a rear side member 27, of a channel shape in transverse cross section, and connected together by a base frame 46. A conveyer 28 movable longitudinally of the main frame 24 is movably supported on a pair of shafts 29 and 31 extended transversely of the main frame and rotatably carried on the side members 26 and 27. As best appears in Fig. 2 the conveyer 28 is of a shorter length than the main frame 24, so as to be spaced inwardly from one end of the frame to form a crop discharge portion indicated at 32. A usual cutter bar mechanism 33 is carried on the rear side member 27 with the end section 34 thereof positioned rearwardly of the crop discharge portion 32.

Secured in a spaced relation longitudinally of the front side member 26 (Figs. 1, 4 and 8) are a plurality of upright supports 35, illustrated as three in number, which terminate at their upper ends in bearing sleeves 36. A tubular rock shaft 37, positioned longitudinally of the main frame 24, and rotatably carried within the bearing sleeves 36 is provided with a pair of rearwardly extended rock arms 38 and a forwardly extended rock arm 39 (Fig. 1).

The rearwardly extended rock arms 38 are positioned at opposite ends of the rock shaft 37 and carry at their free ends bearing members 40 for rotatably supporting a shaft 41 of a reel member 42. The reel member 42 is of a usual type provided with radially extended spokes 43 for carrying longitudinally extended paddle members 44. The rock arms 38 are of a length such that the reel shaft 41 is positioned substantially above the cutter mechanism 33. On rocking movement of the shaft 37 the reel member 42 is adjustably movable relative to the cutter bar mechanism 33 in a manner to be later explained.

The main frame 24 is formed as a unit with the base frame 46 which includes a pair of frame members 47 (Figs. 1 and 2) secured to the under side of the main frame side members 26 and 27 and arranged transversely of the main frame in a reversely inclined relation so that their front end sections 48 converge. The rear ends of the converging members 47 terminate at the rear side member 27 and their front end sections 48 project forwardly of the main frame 24 a distance apart providing for their being received between the rear wheels 49 of the tractor 15. The front ends of the converging members 47 are connected together by a brace member 51, and the front end sections 48 are connected together by a pair of brace members 52 and 53 extended longitudinally of the main frame 24 and located intermediate the front brace member 51 and the front frame member 26. Secured between and on the top sides of the longitudinal brace members 52 and 53 are oppositely arranged pairs of upright ears or lugs 54. Braces 55 are connected between the upright supports 35 and the base frame 46.

In the assembly of the windrower attachment with the tractor 15 the front end sections 48 of the base frame 46 are positioned between the tractor rear wheels 49 with the lift arms 17 of the tractor, located on the top of the crossbar 51. The attachment is then moved forwardly until the rear ends of the lift arms 17 are disposed between corresponding pairs of the upright ears 54. Pivot pins or bolts 56 are then extended through each lift arm 17 and a pair of ears 54.

With the attachment thus connected with the lift arms 17, and by virtue of its rearwardly overhanging position relative to the pivots 56, the main frame 24 pivots or tilts downwardly and rearwardly, by the action of gravity, to a stop position defined by the engagement of the top side of the front crossbar or connecting member 51 with the under side of the lift arms 17. In other words, the center of gravity of the attachment is located rearwardly of the pivots 56 so that the weight of the attachment acts to force the crossbar 51 into engagement with the undersides of the arms 17. As a result the attachment is supported on the arms 17 for pivotal up and down movement therewith. It is seen, therefore, that the main frame 24 is assembled for support on the lift arms 17 by only the insertion of the pins 56 and the engagement of the crossbar 51 with the lift arms 17.

For adjustment of the reel member 42 relative to the cutter bar mechanism 33 the forwardly extended rock arm 39 has its free or forward end pivotally connected at 58 (Figs. 6 and 7) with a rear screw member 59 forming part of an adjustable link 61, which also includes a front screw member 62 pivotally connected at 63 to a bell crank member 64, that is a part of the power lift unit 16. The bell crank 64 is pivotally supported on the tractor differential housing 19.

The screws 59 and 62 are reversely threaded, namely, one is a lefthand screw while the other is a righthand screw, and are threadably connected within the opposite ends of a tubular body member 66 which has a transverse handle 67. Thus on rotation of the tubular body member 66 the screws 59 and 62 are concurrently retracted or extended relative to the opposite ends of the tubular member 66.

With reference to Fig. 6 and with the lift arms 17 of the power unit 16 in an adjusted position, on rotation of the tubular member 66 to extend the screws 59 and 62 therefrom the rock arm 39 is moved downwardly from its full line position to its dotted line position, to in turn provide for an upward movement of the rock arms 38. The reel member 42 is thus moved upwardly relative to the cutter bar mechanism 33, from its full line position to its dotted line position also shown in Fig. 6. This adjustment of the reel 42 relative to the cutter mechanism 33 thus takes place independently of any pivoted movement of the lift arms 17.

Referring to Fig. 7, let it be assumed that the adjustable link 61, rock arm 39, rock arms 38 and reel 42 are in their positions shown in full lines relative to the cutter bar mechanism 33. On an upward movement of the lift arms 17 from their full line positions to their dotted line positions also shown in Fig. 7, the link member 6 is swung upwardly, to in turn provide for an upward movement of the rock arm 39 and an upward movement of the rock arms 38 to their dotted line positions.

This movement of the rock arms 39 and 38 results in the upward movement of the reel member 42 relative to the cutter bar mechanism 33.

It is seen, therefore, that on operation of the power lift unit 16 to elevate the attachment for transport purposes, the reel member 42 is concurrently moved upwardly away from its previously adjusted position as provided by the actuation of the adjustable link 61. It is to be noted further that on lowering of the lift arms 17, to lower the attachment into an operating position therefor, the reel member 42 is concurrently moved toward the cutter bar mechanism 33 to a previous adjusted position as established by the adjustable link 61.

The conveyor 28, cutter mechanism 33 and reel member 42 are operated from the tractor power take-off 71 (Figs. 1 and 3) by means including a telescoping shaft unit 72 and a drive shaft 73 rotatably supported in a bearing structure 74 mounted on the brace members 52 and 53 and provided with a driving gear 76 of sprocket type.

The gear 76 (Figs. 2 and 8) is connected through a sprocket chain 77 with a sprocket gear 78 mounted on a forward extension 79 of the conveyor shaft 29. The rear end of the conveyor shaft 29 drives the cutter mechanism 33 in a manner to be later explained. Also mounted on the rear extension 79 of the shaft 29 is a V-belt pulley 81 which comprises part of the power transmission system for the reel member 42. An annular or ring pulley 82, of a substantially U-shape in transverse cross section, is mounted peripherally about the paddles 44 at the end 83 of the reel member 42 adjacent to the conveyor shaft 29. A pair of V-belt pulleys 84 and 86 are rotatably mounted for relative rotation on the rock shaft 37 at a position forwardly of the reel pulley 82. A single belt 87 travels from the pulley 81 over the pulley 84, under the reel pulley 82, and from the top side of the reel pulley 82 over the pulley 86 to the pulley 81. A suitable tension device 85 may be used in conjunction with the belt 87 to maintain the same in frictional engagement with the pulleys 81, 84 and 86.

It is seen, therefore, that the conveyor 28 and reel member 42 are driven directly from the gear 78 and pulley 81, respectively, which are carried on the rear extension 79 of the conveyor shaft 29. The front end of the conveyor shaft 29 (Fig. 4) carries an eccentrically mounted roller 88 for reciprocal movement within a yoke unit 89. The unit 89 is comprised of a pair of upright guide plates 91 and 92 which have disposed between their opposite ends vertically spaced tubular spacer members 93 of a length corresponding substantially to the diameter of the roller 88. The guide plate 91 is secured directly to the end 94 of the cutter bar 96, which forms part of the cutter mechanism 33, by welding or the like as indicated at 97. The tubular members 93 have off center bores 98 and clamping bolts 99 extended through the guide plates 91 and 92 and tubular spacers 93 connect the guide plates together.

The tubular spacers 93 are arranged between the guide plates 91 and 92 so that the outer side portions 101 thereof are directly engageable with guide members 102 and 103 which guide the reciprocal movement of the cutter bar 96. The members 102 and 103 constitute the opposite legs of a channel member 104, with the leg 103 being secured directly, as by welding, to the usual guard member 105 for the cutter bar 96. On the rotation of a tubular member 93 about a clamping bolt 99 the vertical projection of the side portions 101 from the guide plates 91 and 92 is varied, to in turn provide for a variation in the working clearance between the tubular members 93 and the guides 102 and 103. By virtue of this adjustment the yoke 89 is prevented from having any unnecessary play or excessive working tolerance with the guide members 102 and 103.

It is seen, therefore, that the conveyor shaft 29 constitutes a common drive shaft for all of the working parts of the windrower in that the reel member 42 and cutter mechanism 33 are operated from the opposite ends thereof, and the conveyor 28 from the central portion thereof.

In the use of the power unit 16, when an implement such as the windrower attachment of this invention is carried at a raised position on the lift arm 17, the arms 17 have a tendency to progressively move downwardly due to oil seepage or leakage about the pump (not shown) or hydraulic cylinder (not shown) which are incorporated and become a part of the unit 16.

To overcome what might be termed the downward slipping movement of the lift arm 17, there is provided a jack or holder unit 110 (Figs. 2 and 3), which includes a socket member 111 secured to an open supporting ring 112 mounted on the tractor axle housing 113. A jack standard 114, having its lower end 116 received in the socket 111 is provided with an adjustable lift block 117, which is secured by a bolt member 118 directly to the free end of a lift crank 22. Positioned within the lift block 117 is a suitable pawl or detent member (not shown) which is selectively engageable with notches 119 formed on the standard 114. The detent is releasably engaged with the notches 119 by a locking means indicated generally at 121, so that on release of the locking means 121 the block 117 is freely movable vertically of the standard 114, and with the locking means in an operating position, the detent is freely movable upwardly on the notches 119 but is engageable with a notch to prevent any downward movement of the lift crank 22.

From the above description it is seen that the invention provides a windrower attachment for a tractor which is of a simple and compact construction and readily assembled with and removed from the tractor. In this connection it is to be noted that the removal of the telescoping shaft 72 from the power take-off unit 71 completely disconnects the power transmission system of the windrower from the tractor, and that the removal of the pins 56 provides for the removal of the attachment from the lift arms 17. Also, the reel member 42 with the lift arms 17, at a moved position providing for a proper elevation of the cutter mechanism 33 relative to the crop to be windrowed, is adjusted relative to the cutter mechanism 33 by the manipulation of the adjustable link 61. In the transport of the attachment, the reel member 42 is moved away from the cutter mechanism 33 in response to the upward movement of the lift arms 17, without in any way affecting the adjustment of the link 61. This feature of invention is also utilized to automatically set the reel 42 relative to cutter mechanism 33 for different heights of grain.

Although the invention has been described with respect to a preferred embodiment thereof it is to be understood that it is not to be so limited since changes can be made therein which are within the full intended scope of this invention as defined by the appended claims.

I claim:

1. A windrower attachment for a tractor equipped with a pair of rearwardly projected lift arms pivotally supported at the front ends thereof on the tractor for up and down movement, said attachment comprising a main frame extended transversely of the tractor at a position rearwardly thereof, means supporting said main frame on said lift arms for up and down movement therewith, an upright frame structure at the front end of said main frame, a cutting mechanism at the rear end of said main frame, a rock shaft on said upright frame structure extended longitudinally of said main frame, a pair of axially spaced rearwardly projected rock arms on said rock shaft, a forwardly projected rock arm on said rock shaft, an adjustable link pivotally connected between the tractor and said forwardly projected rock arm, a reel member rotatably supported between the rear ends of said pair of rock arms, said forwardly projected rock arm on adjustment of said link, providing for the movement of said reel member relative to said cutting mechanism, and in an adjusted position of said link providing for the movement of said reel member upwardly from said cutting mechanism in response to the upward pivotal movement of said lift frame.

2. A windrower attachment for a tractor equipped with a pair of rearwardly projected lift arms pivotally supported at the front end thereof on the tractor for up and down movement, said attachment comprising a main frame extended transversely of the tractor at a position rearwardly thereof and supported on said lift arms for up and down movement therewith, an upright frame structure at the front end of said main frame, a cutting mechanism at the rear end of said main frame, a rock shaft on said upright frame structure extended longitudinally of said main frame, rearwardly projected rock arms on said rock shaft, a reel member rotatably supported on the rear ends of said rock shafts, means connected between said rock shaft and said tractor for adjustably moving said reel member relative to said cutting mechanism, an annular pulley member mounted on said reel member in a peripheral relation therewith, and means including a belt member extended about said pulley member for driving said reel member and cutting mechanism from said tractor.

3. In a windrower attachment for a tractor having a rear end power take-off, a main frame, means connected to and extended between the tractor and the main frame for supporting said frame from the tractor at a position rearwardly of and extended transversely of the tractor, a conveyer movable longitudinally of said main frame, a pair of rotatable shafts mounted at opposite ends of said main frame in positions extended transversely of said frame for movably supporting said conveyer, a cutter bar mechanism at the rear side of said frame, a reel member rotatably mounted on said frame at a position above said cutter bar mechanism, a pulley mounted peripherally about said reel member, a pair of drive members mounted about one of said shafts, means operatively associated with one of said pair of drive members and said power takeoff for driving said one drive member from said power take-off, a belt connection between the pulley on said reel member and the second one of said drive members, and means operatively associated with said one shaft and said cutter bar mechanism for operating said cutter bar mechanism from said one shaft.

4. In a harvesting machine having a main frame, a conveyer movable longitudinally of said main frame, a pair of transverse shafts rotatably carried at opposite ends of said main frame for movably supporting said conveyer, a longitudinal cutter bar movably supported for reciprocating movement longitudinally of said frame, means for reciprocating said cutter bar including a roller eccentrically mounted on an end of one of said transverse shafts, a pair of upright longitudinally spaced guide members for guidably receiving said roller therebetween, with one of said upright members being secured to one end of said cutter bar, means connecting the second upright member with said first upright member including vertically spaced tubular members having offset center bores, with said tubular members being positioned between opposite ends of said upright members with one of their side portions projected vertically beyond said ends, clamp means extended through said tubular members, and said upright members, and vertically spaced longitudinal guide members on said main frame for slidably engaging the projected side portions of said tubular members to guide the reciprocal movement of said cutter bar, with said tubular members being rotatable about said clamp means to vary the working clearance between said longitudinal guide members and said tubular members.

5. In a windrower attachment for a tractor having a rearwardly extended pivoted lift structure, a main frame supported on said lift structure at a position rearwardly of the tractor for pivotal movement with said lift structure, a cutter bar mechanism carried on the rear side of said main frame, a reel member, means on said main frame for supporting said reel member above said cutter bar mechanism including a rock shaft extended transversely of the tractor, a pair of rearwardly projected rock arms and a forwardly projected rock arm secured to said rock shaft, means rotatably mounting said reel member on said rearwardly projected rock arms, and a link member movably connected to the tractor and to said forwardly projected rock arm, whereby on pivoted movement of said lift structure said reel member is moved relative to said cutter bar mechanism.

6. A windrower attachment for a tractor equipped with a rearwardly projected lift structure pivotally supported at the front end thereof on the tractor for pivotal up and down movement, said attachment including a main frame extended transversely of the tractor at a position rearwardly of the tractor, transversely spaced forwardly extended supporting arms on said main frame positioned below said lift structure, a brace member connected between the front ends of said supporting arms, a reel member rotatably supported on said main frame, a cutter mechanism on said main frame arranged below said reel member in operative association therewith, and pivot means for detachably connecting said lift structure with said supporting arms at a position rearwardly of said brace member, with the center of gravity of said attachment being located rearwardly of said pivot means so that the action of gravity on said main frame provides for the engagement of said brace member with the underside of said lift structure to support said main frame for movement as a unit with said lift structure.

7. In a harvesting machine having a main frame, a conveyor movable longitudinally of said main frame, a pair of transverse shafts rotatably carried at opposite ends of said main frame for movably supporting said conveyor, a longitudinal cutter bar movably supported for reciprocating movement longitudinally of said frame, means for reciprocating said cutting bar including a roller eccentrically mounted on an end of one of said transverse shafts, an upright yoke unit mounted adjacent one end of said cutter bar for reciprocating movement therewith, with said roller being guidably received within said yoke unit, and means on said main frame and located at said one end of the cutter bar for guidably supporting said cutter bar and the yoke unit against up and down movement.

References Cited in the file of this patent

UNITED STATES PATENTS

| Number | Name | Date |
|---|---|---|
| 2,375,848 | Hume | May 15, 1945 |
| 2,455,122 | Hansen | Nov. 30, 1948 |
| 2,466,555 | Paine | Apr. 5, 1949 |
| 2,472,762 | Sage | June 7, 1949 |
| 2,487,144 | Kriedeman | Nov. 8, 1949 |
| 2,501,424 | Ufer | Mar. 21, 1950 |
| 2,530,668 | Tallman | Nov. 21, 1950 |
| 2,593,617 | Schroeppel | Apr. 22, 1952 |